E. C. ABERNETHY.
VEHICLE SPRING.
APPLICATION FILED MAY 24, 1916.
1,215,232.
Patented Feb. 6, 1917.
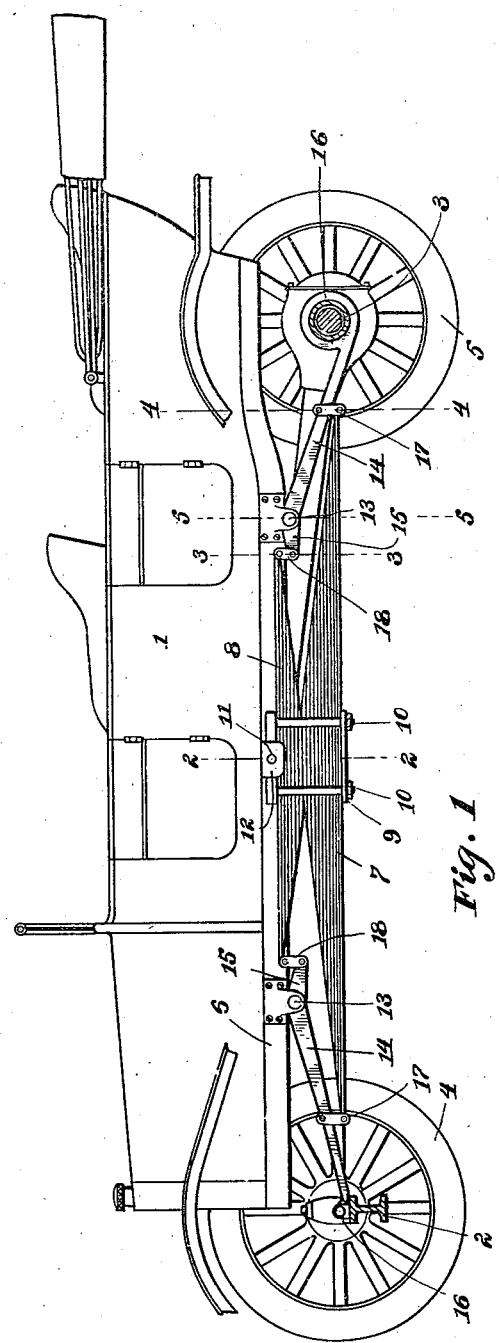
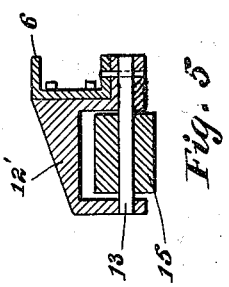
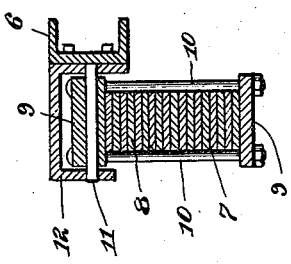
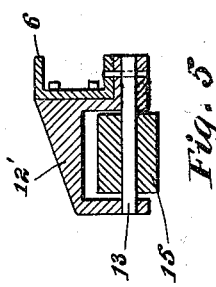
Inventor
E. C. Abernethy,
By Victor J. Evans
Attorney
Witnesses
C. F. Rudolph
R. M. Smith

UNITED STATES PATENT OFFICE.

EUGENE C. ABERNETHY, OF HOLLIS, OKLAHOMA.

VEHICLE-SPRING.

1,215,232.  Specification of Letters Patent.  Patented Feb. 6, 1917.

Application filed May 24, 1916. Serial No. 99,579.

*To all whom it may concern:*

Be it known that I, EUGENE C. ABERNETHY, a citizen of the United States, residing at Hollis, in the county of Harmon and State of Oklahoma, have invented new and useful Improvements in Vehicle-Springs, of which the following is a specification.

This invention relates to vehicle springs or resilient body supports for vehicles, the object of the invention being to give greater resiliency to the car when moving over rough road surfaces, to equalize or distribute the weight of the car on the front and rear axles and to absorb to an increased extent the shocks which are ordinarily transmitted to the body of the car when the front and rear wheels meet obstructions or drop into depressions in the road surface.

With the above and other objects in view, the invention consists in the novel construction, combination and arrangement of parts, as herein described, illustrated and claimed.

In the accompanying drawings:—

Figure 1 is a side elevation of an automobile showing the adjacent spring arrangement of this invention in the applied relation thereof to the body and axles.

Fig. 2 is a vertical cross section on the line 2—2 of Fig. 1.

Fig. 3 is a section on the line 3—3 of Fig. 1.

Fig. 4 is a section on the line 4—4 of Fig. 1.

Fig. 5 is a fragmentary section on the line 5—5 of Fig. 1.

Referring to the drawings 1 designates the body of the vehicle, 2 the front axle, 3 the rear axle, 4 the front wheels and 5 the rear wheels.

The body 1 is mounted as usual upon the body supporting frame or chassis 6 and the latter is resiliently supported at the necessary elevation above the front and rear axles by the spring supporting means of this invention. The resilient support contemplated in this invention comprises a main spring member 7 which extends nearly from one axle to the other, said spring in the preferred embodiment of the invention being illustrated as of the leaf type, comprising any desired number of leaves of different lengths and thereby forming a spring which is thickest at the center and which tapers from the center toward the opposite extremities thereof.

8 represents another spring similar in construction to the spring 7 but disposed inversely thereto so that the apexes of said springs 7 and 8 bear against each other where they are firmly secured together by means of clamping plates 9 and bolts 10 so as to firmly bind the two springs together. The spring structure thus formed is connected by a pivot 11 to a hanger 12 fastened to the adjacent bar of the frame 6. This forms a pivotal connection between the compound spring and the frame of the machine.

Arranged at the front and rear of the machine and connected to the adjacent bar 6 of the frame by means of brackets 12' and pivots 13 are two armed levers each of which comprises a relatively long arm 14 and a relatively short arm 15. The longer arms 14 extend toward the respective axles to which they are connected in any convenient manner at 16. At a point between the ends thereof, the arms 14 are connected to the respective front and rear extremities of the spring member 7 by means of swinging links 17 each having a pivotal connection with the adjacent arm and the adjacent spring terminal.

The shorter arm 15 of each lever is connected by means of a pivotal link 18 to the adjacent extremity of the spring 8. It will thus be seen that the spring members 7 and 8 have a rigid connection with each other at their centers and a yieldable connection with each other at their extremities, the extremities being coupled together by means of the levers in conjunction with the pivotal links 17 and 18.

From the foregoing description, taken in connection with the accompanying drawings it will now be seen that the major portion of the weight of the body 1 is supported centrally by the spring members 7 and 8, the latter being in turn yieldingly supported at their extremities by the levers above described. The arrangement referred to serves to distribute the load on both axles of the machine when a greater load is imposed upon one end of the car than upon the other thus keeping the body normally and substantially in the same relation to the axles. When there is a tendency for one end of the vehicle body to dip, the weight of such end of the body is sustained by the adjacent extremities of the spring members 7 and 8 while the tendency of the opposite end of the body to rise is resisted by the adjacent extremities of said spring members. Therefore, the spring members 7 and 8 act to equalize and distribute the weight of the load upon the front and rear axles and also impart additional resiliency between the body and axles.

I do not desire to be limited to the exact arrangement of the different members of the resilient support as illustrated in the accompanying drawings but reserve the right to make such changes as properly fall within the scope of the appended claim.

I claim:—

In a wheeled vehicle, a resilient body supporting structure interposed between the body and axles, the same comprising two spring members each tapering from the center toward the extremities thereof, a clamp rigidly connecting the central portions of said spring members and having a pivotal connection with the frame of the vehicle, and two armed levers connected by pivotal links to the opposite extremities of said spring members, said levers being pivotally connected to the frame of the vehicle and connected at their outer extremities with the front and rear axles.

In testimony whereof I affix my signature.

EUGENE C. ABERNETHY.

Witnesses:
 DONALD COX,
 J. R. McCUTCHEON.